April 12, 1960   S. N. HOWELL   2,932,126
MODEL RAILROAD HOT-BOX DETECTOR
Filed March 14, 1955   2 Sheets-Sheet 1
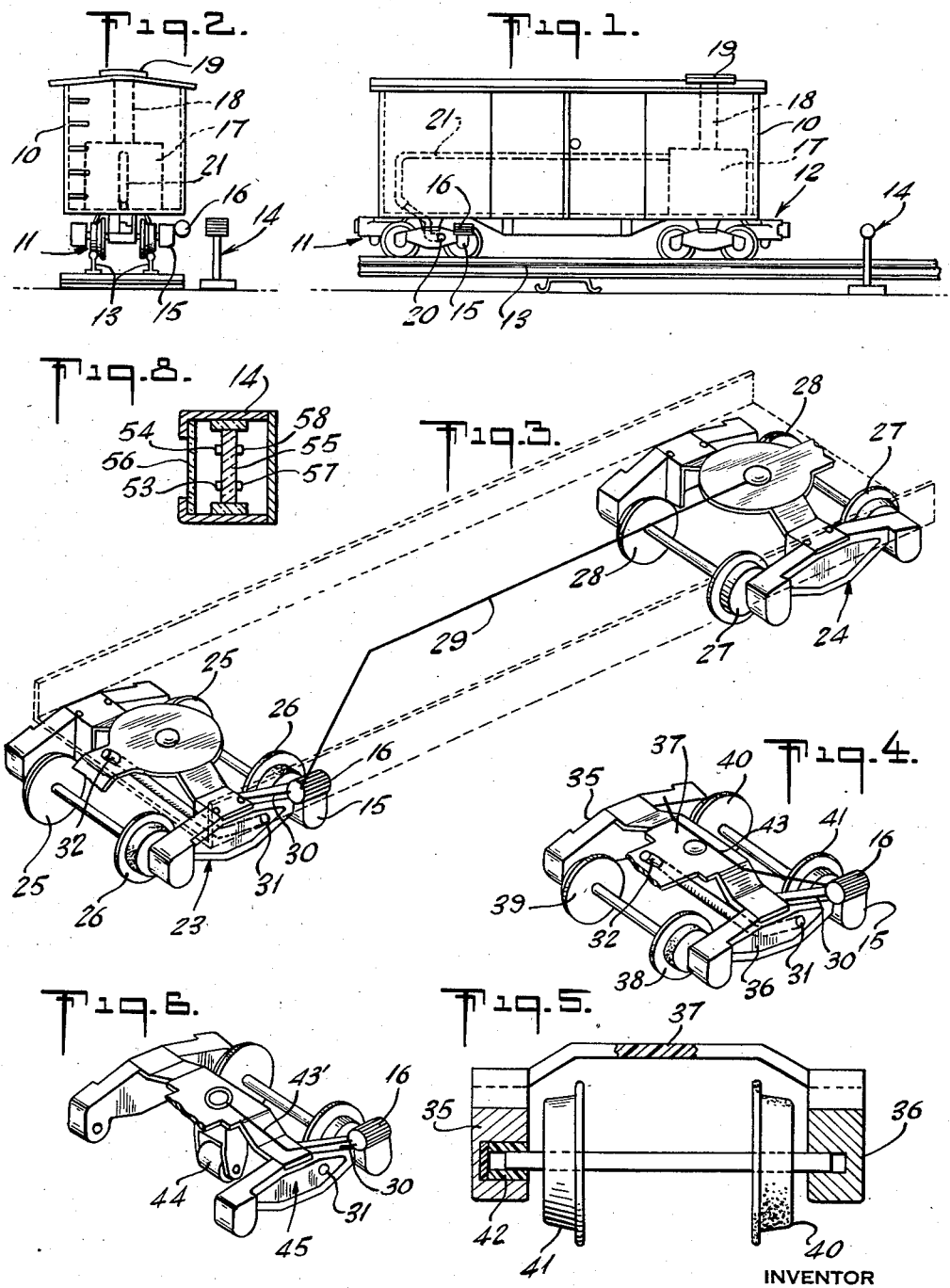
INVENTOR
SABERT N. HOWELL
BY
ATTORNEYS

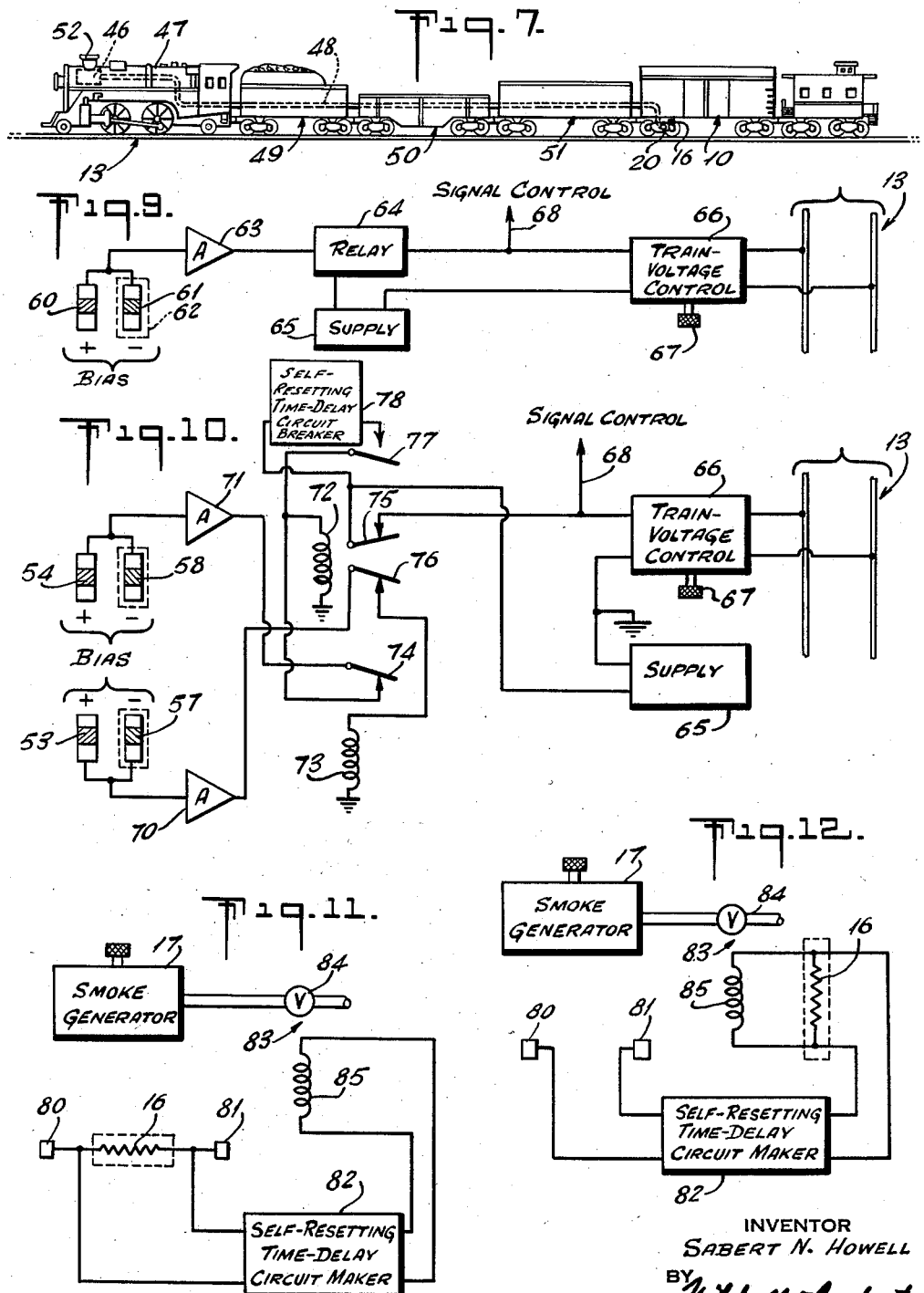

2,932,126
Patented Apr. 12, 1960

2,932,126

MODEL RAILROAD HOT-BOX DETECTOR

Sabert N. Howell, Huntington, N.Y., assignor to Servo Corporation of America, New Hyde Park, N.Y., a corporation of New York Application March 14, 1955, Serial No. 493,974

10 Claims. (Cl. 46—243)

My invention relates to automatic mechanism having particular utility in the operation of a model railroad or the like.

In the operation of full-scale railroads, the development of hot boxes is a perpetual problem and frequently endangers the safety of a train. This problem is not encountered in the operation of model railroads, but the model-railroad enthusiast demands the utmost in realism.

It is, accordingly, an object of the invention to provide model-railroad equipment with improved features of realism.

It is another object to provide means for simulating, on a model railroad, hot-box conditions as encountered in full-scale railroad operation.

It is a further object to provide automatically operated means responsive to the detection of simulated hot-box conditions for controlling train operation.

It is a specific object to meet the above objects with a regulated heat source mounted on a model-railroad vehicle and with automatically controlled smoke-generating means discharging smoke in the vicinity of a simulated hot box.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a side view in elevation of a model-railroad car equipped with devices of the invention and mounted on a track that is monitored with a device of the invention;

Fig. 2 is an end view of the combination of Fig. 1;

Fig. 3 is a perspective view of the wheel relation for the vehicle of Fig. 1, the main frame of the vehicle being merely shown in phantom, in order better to display the coordinated functioning of parts of the invention;

Fig. 4 is a perspective view of a truck incorporating features of the invention and representing a modification of the arrangement of Fig. 3;

Fig. 5 is a sectional view through one of the axles of the truck of Fig. 4;

Fig. 6 is a view similar to Fig. 4, but illustrating a further modification;

Fig. 7 is a view of a model-railroad train incorporating features of the invention and representing a modification of the arrangement of Fig. 1;

Fig. 8 is a sectional view of trackside-mounted equipment in Fig. 1;

Figs. 9 and 10 are circuit diagrams representing alternative modes of utilizing trackside-mounted equipment; and Figs. 11 and 12 are simplified electrical diagrams schematically showing alternative vehicle-carried arrangements of the invention.

Briefly stated, my invention contemplates realistic simulation, on model-railroad scale, of hot-box conditions of the type which have for years plagued full-scale railroad operators. The simulator comprises a heat source and a smoke generator, so localized as to produce heat and smoke effects uniquely identifiable with a particular journal box on a whole train. My novel equipment includes trackside-mounted heat-responsive means capable of developing an electrical signal upon the detected passage of the simulated hot box, and automatic controls function in response to detection of the "hot box." These automatic controls may govern remote signals to display appropriate warnings to the oncoming train and may cut off power to the train.

Referring to Figs. 1 and 2 of the drawings, my invention is shown in application to a freight car 10 having a pair of trucks 11—12 pivotally supported at the ends of the car. The car rides a section 13 of electrified track, and alongside the track is mounted detector means 14 of the invention.

Simulation equipment for a hot box, as on the journal end 15, may comprise a localized heat source, effectively a "point" source, such as a small coil 16 of resistance wire mounted inconspicuously in the vicinity of the journal end 15. The coil 16 is shown carried by the truck frame, but it will be understood that in certain applications sufficient realism will be achieved if the coil 16 is mounted underneath the frame of the car 10. Simulation equipment further includes a smoke generator, schematically designated by the dashed outline 17 and carried within the car 10. The smoke generator is shown to be of the variety which consumes fluid, and thus the generator 17 includes a filler pipe 18 and cover 19; depending on the type of smoke generator 17 used, electric-heating means therefor (not shown) may be supplied by the collector means to be described, as will be understood. In order not to spoil the realism, the filler-pipe cover 19 may be in the form of a removable hatch, as of the type used on refrigerator cars; other types of cover will be understood to be desirable for other types of cars. The smoke generator may be connected to the desired discharge location 20 by means of a conduit 21 including flexible material so as to permit pivotal movement of the truck as the car is accommodated on track of varying curvature.

In Fig. 3, the car frame on which my simulator equipment is mounted includes collector means deriving electrical voltage from the track. For the form shown, the track is assumed to be of the two-rail variety in which the two rails are oppositely polarized. Thus, the forward truck 23 and the rear truck 24 may be duplicates of each other, and since they face in opposite directions, the respective trucks will reflect polarity of the respective rails on which they ride; the connections of trucks 23—24 to the car 10 should include provision for mutual insulation of trucks 23—24, as by forming the car frame of plastic.

Collector trucks of the character indicated are familiar to those skilled in the art, and it suffices here to say that polarity of voltage collection is achieved by having the wheels 25 on one side of one truck conductive, and the wheels 26 on the other side of said truck non-conductive; in the case of truck 24, wheels 27 will be conductive, and wheels 28 non-conductive. The truck 23 in Fig. 3 is shown equipped with the heat source 16, secured as by a suitable cement, over the journal box 15, and electrical connection thereto is made by flexible means 29 connected to the truck 24, and means 30 connected to the truck 23. With this arrangement, the source 16 will develop heat as long as voltage is supplied to the track.

The smoke-simulating means in Fig. 3 may simply comprise a duct or conduit system discharging at 31 and having a supply connection 32 near the pivotal suspension for the truck. The connection 32 may be flexibly coupled by means 21 to the generator 17, or it may be connected to a smoke generator in a locomotive, as will appear from the discussion below in connection with Fig. 7.

In Figs. 4 and 5, I show a modification in which the hot-box-source simulator may be built into a single truck and thus may be applied simply to any desired model-railroad vehicle with minimum adaptation. The truck of Figs. 4 and 5 comprises a frame with side members 35—36, connected by cross-member means 37, and the heat source 16 may be mounted near the journal box 15. For a two-track electrical system as described in connection with Fig. 3, the insulating wheel 38 (stippled shading) and the conductive wheel 39 for one axle are connected in opposition to the insulated wheel 40 (stippled shading) and conducting wheel 41 of the other axle. The side members 35—36 may be conductive, but their connection by way of member 37 includes means for mutual insulation, as by fabricating the connecting member 37 of plastic. An insulating cup or bushing 42 on side member 35 (for the axle of wheels 40—41) and a similar bushing (not shown) on side member 36 (for the axle of wheels 38—39) assure that the side members 35—36 will collect with opposite polarity, so that electrical connections (30—43) to the coil 16 may simply be made to the respective side-frame members 35—36, as will be understood.

In Fig. 6, I show a further modification for the case of so-called three-track electric trains in which a center shoe 44 is polarized with respect to the rest of the frame 45 of the truck. In that event, the coil 16 may be merely connected at 30 to the frame 45 and at 43' to the shoe 44.

In Fig. 7, I show that a car, such as described at 10 in Fig. 1, need not carry its own smoke-generating device, but may use the smoke developed by the generator 46 in a locomotive 47 of otherwise conventional construction. A single flexible conduit 48 may connect the generator 46 with the discharge opening 20 adjacent the simulated hot box; alternatively, each one of the vehicles 49—50—51 (between the locomotive 47 and the car 10) may be provided with separate through-conduits, removably flexibly connected to each other, as will be understood. Depending upon the amount of smoke desired from the discharge opening 20, the locomotive smoke stack 52 may be plugged or not.

In Fig. 8, I show, in simplified form, the basic elements of a trackside detector 14; said detector may comprise one or more heat-sensitive cells 53—54 suitably mounted on means 55 within the head of the device. The head or housing is shown to be generally cup-shaped, with an opening facing transverse to the track so that the elements 53—54 may "look" for possible hot boxes, the spacing of elements 53—54 being longitudinal in the sense of the course of the track. A window 56 may close the housing and be of a material to transmit infrared radiations. Such material may be arsenic-trisulfide glass, and the heat-detecting elements 53—54 may be metallic-oxide flakes of the variety known as thermistor flakes. The assembly is shown to be completed by provision of two further heat-sensitive elements 57—58, shielded from the radiations to which the elements 53—54 are exposed and serving, therefore, to establish ambient references for operation of the elements 53—54.

In Fig. 9, I show an automatic control circuit involving a simplified trackside detector comprising but one cell element 60 (corresponding to one of the elements 53—54 of Fig. 8) exposed to or facing the hot box to be detected; the shielded cell 61 (corresponding to one of the elements 57—58) is so designated by means of the phantom line 62. The elements 60—61 may be bridge-connected and polarized, as by a D.-C. supply, suggested in the drawing. The differential output of the exposed and unexposed cells is shown supplied to amplifier means 63, thence to relay means 64. The relay means 64 is shown controlling the application of supply voltage from source 65 to train-voltage-control means 66, having manual means 67 for varying the voltage and therefore the speed of the train. The arrangement is such that when a heat signal of sufficient magnitude is detected, relay 64 will operate to break the circuit to the train-voltage control 66 so as immediately to stop the train. If desired, a connection, suggested at 68, may be made to trackside-mounted signalling equipment (not shown) so as to enhance the realism of the operation by making it appear that the train is warned by the signal before actually stopping.

In the arrangement of Fig. 10, the automatic control of the train is somewhat refined by employing the twin-cell configuration discussed in connection with Fig. 8. Each of the cells 53—54 is bridge-connected with its compensator cell 57—58 and separately supplies amplifier means 70—71. The amplifier 71 is connected to operate the coil 72 of a first relay, and the amplifier 70 is connected to operate the coil 73 of a second relay. The single contact arm 74 of the relay 73 is normally closed and is in series with the connection of amplifier 71 to coil 72; relay 72 includes two contact arms 75—76, of which arm 76 is normally closed and is in series with the connection of amplifier 70 to coil 73, and arm 75 (to the track-excitation circuit) is normally closed. Thus, if a train should be proceeding in the direction to develop a heat signal in cell 53 before developing the heat signal in cell 54, the circuit of arm 74 will open to disable possible operation of coil 72; whereas, if the train is proceeding in the direction to excite cell 54 before cell 53, arms 75—76 will be simultaneously actuated to disable possible operation of coil 73 and to govern the train-voltage control means 66, as in the manner described in connection with Fig. 9.

The arrangement of Fig. 10 will be seen as a means for operating the train-voltage control and thus for stopping the train (or for operating a remote-signal mechanism 68) only in response to passage of a train in the desired direction along the track.

The arrangements of Figs. 9 and 10 lend themselves to automatically recycling operation, as for use of the railroad and hot-box simulator in a commercial-demonstration exhibit. In Fig. 10, I show adaptation to such purposes by providing a further normally open contact arm 77 under the control of coil 72. Thus, when coil 72 operates to stop the train, a self-resetting time-delay circuit breaker 78 will function (in response to contact at arm 77) to maintain coil 72 energized after heat-signal actuation of coil 72. The length of time coil 72 remains energized will depend on the length of time the train is to be held stopped. After lapse of such time, means 78 will automatically break the circuit to coil 72 and will allow the train to start, whereupon means 78 automatically resets for the next cycle of operation.

In Fig. 11, I show schematically an integrated structure comprising smoke-generator means 17 and the heat source 16 and adaptable to be wholly carried by a single vehicle, such as the car 10. The heat source 16 is shown continuously connected to the respective poles 80—81 of the collector means so that, as described above, the source 16 will emit heat only while voltage is supplied to run the train. I show the further provision of a self-resetting time-delay circuit maker 82 operating from the collected voltage and serving to supply to smoke-control means 83 a suitable voltage for determining the discharge of smoke only at a predetermined time following initial energizing of the heat source 16. The smoke-control means 83 is shown to include a simple valve 84 and coil 85 arranged to open the valve 84 only when a prescribed time interval has elapsed after the train has started to run. When the train has stopped, the function of the time-delay means 82 is to reset itself and to close the valve 84; thus, on a subsequent starting of the train, it will be necessary for the same delay to lapse before smoke is discharged. With this arrangement, it is possible to simulate gradual development of a hot-box condition, enabling automatic detection before attainment of a temperature which would cause smoke.

Devices as at 78 and 82 are old in the art and are available from numerous commercial sources, therefore no need is seen for encumbering the specification with further details. In application to Fig. 11, for example, such a device would commence operating at 82 as soon as the circuit to the track is energized. This means that the heat source 16 begins to warm up and the timing cycle begins. After the predetermined delay, the circuit coil 85 is closed.

In the arrangement of Fig. 12, both the generation of heat and the discharge of smoke are applied on a delayed basis, and parts corresponding to those of Fig. 11 are given the same reference numerals. The only difference between Figs. 11 and 12 is the circuit connection to the heat source 16 so as to establish delayed generation of heat and delayed discharge of smoke. With this arrangement, it is possible to simulate development of a hot-box condition only after the train has been run for the desired delay interval.

It will be seen that I have described relatively simple mechanism for increasing the realism of a model railroad by simulating not only the heat but also the smoke associated with a hot-box condition. My mechanism functions automatically in response to the heat developed (and not to the smoke) and thus simulates the function of a full-scale hot-box detector, as described in copending patent application Serial No. 349,826, filed April 20, 1953, now abandoned, in the names of Henry Blackstone et al. My device lends itself to the critical demands of the hobbyist and to commercial demonstrations of the functioning of the full-scale device.

While I have described the invention in detail for the preferred forms shown, it will be understood that modifications may be made within the scope of the invention as defined in the claims which follow.

I claim:
1. A model-railroad hot-box simulator, comprising a vehicle having a wheel axle journalled therein at its opposite ends, smoke-generator means including means for locally discharging smoke outwardly of the vehicle and in the vicinity of one journalled end of one of said axles, a localized heat source carried by said vehicle and locally externally exposed adjacent the discharge end of said generator means, and smoke-discharge control means responsive to activation of said source for coordinating discharge of smoke by said smoke-generator means with generation of heat.

2. The simulator of claim 1, in which said control means includes a delay mechanism whereby smoke is not discharged until a period of time following activation of said source.

3. The simulator of claim 1, in which said vehicle includes electrical collector means, and in which said control means includes delay means connected to said collector means and delaying the discharge of smoke for a period of time following excitation of said collector means.

4. The simulator of claim 3, in which said heat source is electrically operated by direct connection to said collector means.

5. The simulator of claim 3, in which said heat source is electrically operated under control of said delay means.

6. A model-railroad vehicle, comprising a body, two spaced wheel trucks pivotally supported on said body, two wheel axles journalled in each truck, collector means including a conductive wheel and a non-conductive wheel on one axle of each truck, said conductive wheels being on opposite sides of said vehicle, and a localized electrically operated infrared heat source connected to said collector means and locally and directly externally exposed to one side to the exclusion of the other side and in the vicinity of only one end of one of said axles, whereby when excited by said collector means said source may be effectively an unshielded "point source" of invisible infrared radiation, localized in the vicinity of said one axle end.

7. A model-railroad vehicle truck, comprising a truck frame with two spaced pairs of journals, two wheel axles supported for rotation in said journals, each axle extending from one side of the truck to the other side thereof, collector means for deriving on said truck an electrical voltage picked up from an electrified track, and an electrically operated infrared heat source connected to said collector means and locally and directly externally exposed on one side to the exclusion of the other side of said vehicle and in the vicinity of only one end of one of said axles, whereby when excited by said collector means said source may be effectively an unshielded "point source" of invisible infrared radiation, localized in the vicinity of said one axle end.

8. The truck of claim 7, in which said heat source includes an element of resistance wire.

9. The truck of claim 7, in which said collector means includes a conductive wheel and a non-conductive wheel on each axle, the conductive wheels of said axles being on opposite sides of said truck.

10. The truck of claim 7, in which said collector means includes a conductive wheel on one of said axles and a centrally located collector shoe.

References Cited in the file of this patent

UNITED STATES PATENTS

| | | |
|---|---|---|
| 1,671,132 | Shoudy | May 29, 1928 |
| 1,737,787 | Dombro | Dec. 3, 1929 |
| 2,002,358 | Smith | May 21, 1935 |
| 2,278,358 | McKeige et al. | Mar. 31, 1942 |
| 2,360,030 | Hicking | Oct. 10, 1944 |
| 2,585,754 | Dunkelberger | Feb. 12, 1952 |
| 2,610,437 | Smith | Sept. 16, 1952 |
| 2,673,419 | Kelch et al. | Mar. 30, 1954 |
| 2,708,885 | Smith et al. | May 24, 1955 |